United States Patent [19]

Bucheler et al.

[11] Patent Number: 4,892,126
[45] Date of Patent: Jan. 9, 1990

[54] THREADED DOSING CAP

[75] Inventors: Herbert Bucheler, Erkrath; Paul O. Weltgen, Hilden, both of Fed. Rep. of Germany

[73] Assignee: Henkel Kommanditgesellschaft auf Aktien, Duesseldorf, Fed. Rep. of Germany

[21] Appl. No.: 277,855

[22] Filed: Nov. 30, 1988

Related U.S. Application Data

[63] Continuation of Ser. No. 537,415, Sep. 6, 1983, abandoned.

[30] Foreign Application Priority Data

Mar. 1, 1982 [DE] Fed. Rep. of Germany ....... 3207223

[51] Int. Cl.$^4$ .............................................. B65D 51/24
[52] U.S. Cl. .................... 141/381; 215/228; 215/341; 215/354; 215/329
[58] Field of Search ......... 141/381; 215/228, DIG. 7, 215/354, 341, 344, 329

[56] References Cited

U.S. PATENT DOCUMENTS

| 2,061,685 | 3/1935 | Wheaton et al. | 221/147 |
| 2,813,650 | 12/1955 | Takahashi et al. | 215/41 |
| 3,142,402 | 7/1964 | Fox | 215/329 X |
| 3,223,269 | 12/1965 | Williams | 215/329 X |

FOREIGN PATENT DOCUMENTS

| 2647393 | 4/1978 | Fed. Rep. of Germany . |
| 1029979 | 3/1953 | France . |
| 1081223 | 6/1954 | France . |
| 50-46273 | 4/1975 | Japan . |
| 50-143556 | 11/1975 | Japan . |
| 51-129658 | 10/1976 | Japan . |
| 766165 | 1/1957 | United Kingdom . |

OTHER PUBLICATIONS

Verschluss fur Kunstoff-Flaschen, Hangelar; Verpackungs-Rundschau, 6, (1966), pp. 788,790,792 and 794.

Primary Examiner—Donald F. Norton
Attorney, Agent, or Firm—Ernest G. Szoke; Wayne C. Jaeschke

[57] ABSTRACT

There is described a threaded dosing cap (1) for a container opening with internal thread (8) and front seal (9) as well as with a breaker type dosing cylinder (5) lying above the container opening in the closing position. A wetting of the container opening and surrounding region by the product running off out of the dosing cylinder (5) used is to be avoided by structural measures. According to the invention, the dosing space (5) is located above the container neck (3) as well as the front seal (9) thereof, and from the dosing space, as the cylindrical prolongation thereof, a product drain ring (6) extends into the container neck (3).

2 Claims, 1 Drawing Sheet

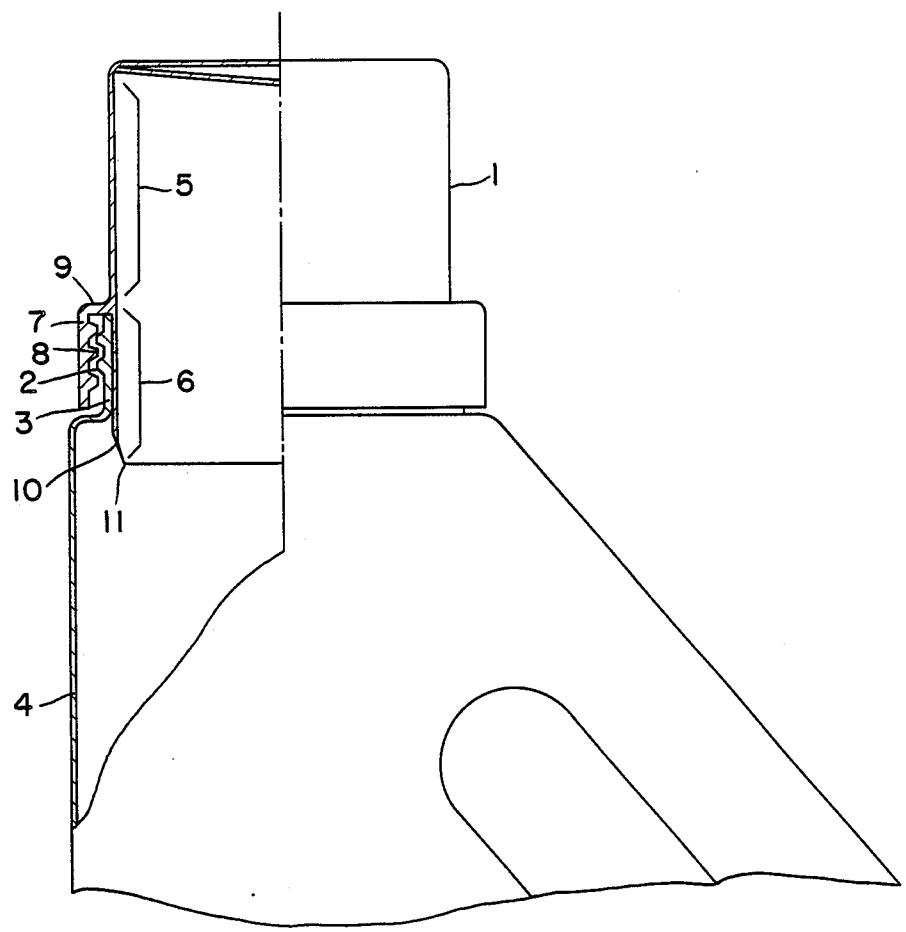

THREADED DOSING CAP

This application is a continuation of application Ser. No. 06/537,415, filed 9/6/83 now abandoned.

The invention relates to a threaded dosing cap for a container opening, in particular for a bottle neck, with an internal screw thread, preferably having a front seal, as well as with a beaker type dosing cylinder present in the closing position above the container opening.

For the dosing of liquid cleaning and brightening agents and the like, screw caps with internal thread with front or cone seal are used. When using such caps for highly viscous products, relatively large product residues may remain in the dosing or metering space and may, after use, wet the container opening as well as the surrounding zone, e.g. the bottle shoulder. As a rule, with the dosing volume also the length of the cap measured in exial direction increases, and hence the length of the material-intensive container or bottle neck which as a rule applies sealingly on the bottom of the dosing cylinder.

To shorten the bottle neck, dosing caps with dosing space extending into the bottle neck have been provided before. It was then necessary, however, to center the bottle and cap well, if the placing on was not to present any problems. Another disadvantage was that the dosing part—especially when the container was full—was wetted by the product, and thus use without the danger of undesired dripping was made difficult.

It is the object of the invention to provide a dosing cap, in the use of which an undesired wetting of the container neck or shoulder or of the dosing part does not occur in normal use and where the closing, in particular also with respect to the centering, can be carried out without a problem without requiring a material-intensive long bottle neck. The solution according to the invention consists in that the dosing cylinder is prolonged at its open end by a product drain ring protruding into the container opening in closed position, and that the screw thread, in particularly with front seal, is applied on the outside of the cylinder as a circling ring.

Accordingly it is achieved by the invention that the dosing space is to be arranged above the container or bottle neck and the sealing surface and yet, because of the product drain ring extending into the bottle neck, product residues will always, after use, run off into the interior of the bottle and not on the bottle neck or the screw thread of the cap and/or container. In the region extending into the bottle neck, the product drain ring is preferably designed at the same time as a sealing element elastically clamping inwardly, being given appropriate dimensions, so that even with the container toppling or tipping, the respective product cannot wet appreciable areas of the outside of the product drain ring, let alone advance to the sealing surface or respectively the threads. Hence neither the outer surface of the dosing cylinder nor the threaded regions are wetted with the product.

Preferably, according to the invention, a threaded ring is integrally formed, for example molded, on the outside of the dosing cylinder, in particular in the boundary region between dosing space and product drain ring, in such a way that the cap can be operated or used with normal screwing means. Obviously with such a design only a small bottle neck height with thread is required and thereby the otherwise customary plastic component for forming the package is reduced accordingly.

According to further invention, it is favorable if the cross-section of the free end of the product drain ring is narrowed relative to the contiguous interior of the ring or dosing space, and in particular then the free end of the product drain ring may terminate obliquely inward with a sharp edge. Such an inwardly tapering sealing and/or centering zone at the dosing cylinder or respectively at the product drain ring integrally formed thereon has a multiple function. In the first place the inward recess is favorable for centering the cap during insertion and screwing on. Further the part of the product drain ring contiguous to the recessed zone can be formed as a sealing means elastically pressed against the inner wall of the container mouth. Lastly an inwardly projecting relatively sharp edge of the product drain ring offers, when product is being poured out of the dosing space, the advantageous possibility of a residual drop-fee pouring, without product discontinuity. This is because the cross-section constriction in question acts to give a deflecting effect.

Further details of the invention are explained with reference to the schematic representation of an embodiment.

In the drawing is shown schematically a dosing cap designated by 1 as a whole—partly in section—screwed onto the bottle neck 3 provided with a thread 2 of a container 4. The dosing cap 1 consists of the cylindrical dosing space 5, the product drain ring 6 contiguous thereto, and the threaded ring 7 integrally formed thereon on the outside. The latter is injection-molded onto the dosing cap 1 preferably approximately in the boundary region between dosing space 5 and product drain ring 6. The threaded ring 7 has on the inside a thread 8 matching the screw thread 2 and at the head a sealing surface 9 associated with the free end of the bottle neck 3.

Of special importance is the product drain ring 6 integrally formed on the dosing space 5 as a cylindrical extension. The dimensions are preferably chosen so that the outer surface of the product drain ring 6 when being inserted into the bottle neck 3 clampingly applies against the inner surface of the latter. Thereby a sealing effect is obtained which virtually excludes a wetting of the outside of the dosing cap 1 of the sealing surface 9, and of the threads 2 and 8, respectively, by product coming out of the interior of the container 4. It is an essential function of the product drain ring 6 to let any product still trapped in the dosing space 5, after cap 1 has been placed on a container 4, drain into the container without wetting of the cap parts.

If the product drain ring 6 has in the region of its free end 10 an inwardly narrowing cross-section, i.e. in particular if the free end of the product drain ring 6 terminates with a sharp edge 11 obliquely inward, the centering of the cap when screwing on is simplified and an almost residual drop-free pouring of product out of the dosing space 5 is made possible.

In addition this narrowed area should extend beyond the clamping area applied against the inner surface of the container opening (3) into the open area of the container (4) as shown in the drawing The preceding specific embodiment is illustrative of the practice of the invention. It is to be understood, however, that other expedients known to those skilled in the art or disclosed herein may be employed without departing from the spirit of the invention or the scope of the appended claims.

We claim:

1. In combination with a container having an externally threaded, reduced neck area, said neck area having an inner surface of predetermined length and an upper circular extremity, said neck area opening into a wider container volume, a dosing cap comprising:

a beaker type dosing cylinder having a drain ring which extends into and through said predetermined length of said reduced neck area, said drain ring wipingly bearing against said inner surface of said reduced neck area over its entire predetermined length to create a seal therebetween and having a lower-most portion which narrows from the inner surface of said reduced neck area and terminates with a sharp edge oriented obliquely inward; and a skirt extending outwardly from said dosing cylinder and concentrically arranged thereabout, said skirt extending over said upper circular extremity of said reduced neck area and having internal threads, said skirt forms a seal when its internal threads are fully engaged with said external threads of said reduced neck area.

2. The invention as defined in claim 1, wherein said seal is formed by the engagement of said upper circular extremity of said neck area with the portion of said skirt which extends thereover.

* * * * *